United States Patent
Francis et al.

(10) Patent No.: US 12,305,769 B2
(45) Date of Patent: May 20, 2025

(54) DELAYED OPENING FLUID COMMUNICATION VALVE

(71) Applicant: Summit Casing Services, LLC, Fort Worth, TX (US)

(72) Inventors: Colten T. Francis, Aledo, TX (US); Ian Beckett, Aledo, TX (US); Andrew M. Eldridge, Fort Worth, TX (US)

(73) Assignee: SUMMIT CASING SERVICES, LLC, Fort Worth, TX (US)

( * ) Notice: Subject to any disclaimer, the term of this patent is extended or adjusted under 35 U.S.C. 154(b) by 142 days.

(21) Appl. No.: 17/949,578

(22) Filed: Sep. 21, 2022

(65) Prior Publication Data
US 2024/0093798 A1    Mar. 21, 2024

(51) Int. Cl.
*E21B 34/06*   (2006.01)
*F16K 17/40*   (2006.01)
*F16K 31/00*   (2006.01)

(52) U.S. Cl.
CPC ............ *F16K 17/40* (2013.01); *F16K 31/001* (2013.01); *E21B 34/063* (2013.01); *E21B 2200/08* (2020.05)

(58) Field of Classification Search
CPC .... E21B 34/063; E21B 2200/08; F16K 17/40; F16K 31/001
See application file for complete search history.

(56) References Cited

U.S. PATENT DOCUMENTS

| | | | |
|---|---|---|---|
| 7,726,406 B2 | 6/2010 | Xu | |
| 8,424,610 B2 * | 4/2013 | Newton | E21B 43/26 166/376 |
| 9,303,484 B2 * | 4/2016 | Storey | E21B 33/1285 |
| 9,976,381 B2 | 5/2018 | Martin et al. | |
| 10,150,713 B2 | 12/2018 | Doud et al. | |
| 10,156,119 B2 | 12/2018 | Martin et al. | |
| 10,337,279 B2 | 7/2019 | Frazier | |
| 10,352,125 B2 | 7/2019 | Frazier | |
| 11,156,050 B1 | 10/2021 | Todd et al. | |
| 11,346,178 B2 | 5/2022 | Takahashi et al. | |
| 2006/0169464 A1 * | 8/2006 | Richards | E21B 43/045 166/332.8 |
| 2013/0341034 A1 * | 12/2013 | Biddick | F16K 31/06 166/373 |
| 2014/0116721 A1 * | 5/2014 | Hofman | E21B 23/00 166/373 |
| 2015/0354310 A1 | 12/2015 | Zaiser | |

(Continued)

*Primary Examiner* — Marina A Tietjen
(74) *Attorney, Agent, or Firm* — Jackson Walker LLP; Christopher J. Rourk

(57) ABSTRACT

A casing valve, comprising a first component configured to connect to a casing string, a second component configured to connect to the casing string, a mandrel disposed between the first component and the second component, the mandrel having a plurality of ports, a housing disposed outside of the mandrel, the housing having a plurality of ports, a piston disposed between the mandrel and the housing and configured to move in a first direction from a first position that forms a barrier between the ports of the mandrel and the ports of the housing to a second position that is adjacent to the ports of the mandrel and the ports of the housing and a dissolvable component configured to restrain the piston in the first position and to dissolve when exposed to a fluid to increase a lateral force on the piston.

20 Claims, 4 Drawing Sheets

(56) References Cited

U.S. PATENT DOCUMENTS

| | | | |
|---|---|---|---|
| 2018/0283130 A1* | 10/2018 | Hofman | E21B 34/063 |
| 2019/0078408 A1* | 3/2019 | Fripp | E21B 23/06 |
| 2019/0078414 A1 | 3/2019 | Frazier | |
| 2020/0102807 A1* | 4/2020 | Kennedy | E21B 34/103 |
| 2020/0149366 A1 | 5/2020 | Kellner | |
| 2020/0406496 A1 | 12/2020 | Howard et al. | |
| 2021/0140255 A1* | 5/2021 | Greci | E21B 34/14 |
| 2021/0230971 A1 | 7/2021 | Saraya et al. | |
| 2021/0253773 A1 | 8/2021 | Ren et al. | |

\* cited by examiner

DELAYED OPENING FLUID COMMUNICATION VALVE

TECHNICAL FIELD

The present disclosure relates generally to drilling technology, and more specifically to a delayed opening fluid communication valve.

BACKGROUND OF THE INVENTION

Drilling operations require control of equipment that can be located thousands of feet underground, which limits the amount of control that can be provided.

SUMMARY OF THE INVENTION

A casing valve, comprising a first component configured to connect to a casing string, a second component configured to connect to the casing string, a mandrel disposed between the first component and the second component, the mandrel having a plurality of ports, a housing disposed outside of the mandrel, the housing having a plurality of ports, a piston disposed between the mandrel and the housing and configured to move in a first direction from a first position that forms a barrier between the ports of the mandrel and the ports of the housing to a second position that is adjacent to the ports of the mandrel and the ports of the housing and a dissolvable component configured to restrain the piston in the first position and to dissolve when exposed to a fluid to increase a lateral force on the piston.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings may be to scale, but emphasis is placed upon clearly illustrating the principles of the present disclosure. Moreover, in the drawings, like reference numerals designate corresponding parts throughout the several views, and in which.

DETAILED DESCRIPTION OF THE INVENTION

Figure 1:
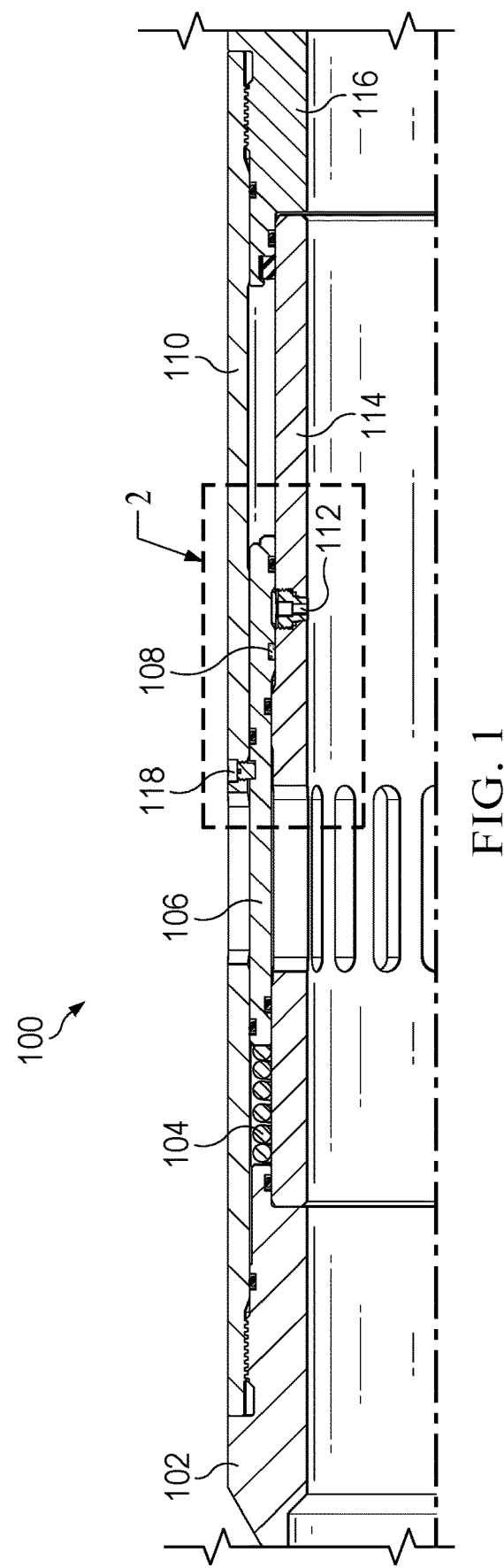
FIG. 1 is a diagram of a valve with dissolving components, in accordance with an example embodiment of the present disclosure.

In the description that follows, like parts are marked throughout the specification and drawings with the same reference numerals. The drawing figures may be to scale and certain components can be shown in generalized or schematic form and identified by commercial designations in the interest of clarity and conciseness.

A valve can be deployed in a casing string in a well bore to allow fluid to be provided to the formation surrounding the valve. The present disclosure provides a structure to facilitate the degradation of a seal, to allow manipulation of areas where pressure will affect a piston that moves to open the valve. Once a rupture disc has been ruptured, the areas beyond the rupture disc where pressure can act on are equal, resulting in a net force of zero. However, once a dissolvable/degradable seal can no longer withstand pressure (which occurs after a predetermined amount of time), pressure acting on an area can make the piston want to move to the right, opening the valve.

There are a number of companies with degradable elastomers; BubbleTight, Parker, Terves to name a few. At this point, we have no preference on supplier so long as the elastomer can withstand the pressure (which has been proven by the fact these degradable elastomers are used on frac plugs with ratings as high as 15,000 psi).

FIG. 1 is a diagram of a valve 100 with dissolving components, in accordance with an example embodiment of the present disclosure. Valve 100 can be used with a toe initiation valve or other suitable valves, such to re-establish communication with the formation once a casing string has been installed or for other suitable purposes. In one example embodiment, valve 100 can be used to delay the communication with the formation as soon as a rupture disc or other suitable pressure-controlled devices are actuated, by preventing a piston or other suitable components from shifting with the valve.

Valve 100 includes box sub 102, spring 104, piston 106, dissolvable seal 108, housing 110, rupture discs 112, mandrel 114 and pin sub 116, which are assembled and shipped in the configuration shown for deployment in a downhole run of drilling tubulars. Box sub 102 is configured to be connected to an up-hole portion of a string of casing tubulars (not explicitly shown) or other suitable components. Box sub 102 can be fabricated from steel, carbon steel or other suitable materials.

Spring 104 can be formed from steel, carbon steel or other suitable materials, and is configured to apply a force to piston 106.

Piston 106 can be formed from steel or other suitable materials and can be configured to move between mandrel 114, box sub 102 and pin sub 116. Piston 106 is configured to selectively block ports of mandrel 114 from fluid communication with ports of housing 110 in a first position and to allow fluid communication between ports of mandrel 114 and ports of housing 110 by moving to a position adjacent to those ports, which allows fluids to be delivered to the formation outside of the casing at valve 100 or for other suitable purposes.

Dissolvable seal 108 can be formed from an elastomer, a rubber, a polymer, a ceramic or other suitable materials that dissolve when exposed to a fluid, such as a drilling fluid. Dissolvable seal 108 can be configured to withstand temperatures and pressure at the same level as o-rings that are adjacent to rupture discs 112 or other suitable mechanical properties.

Housing 110 can be formed from steel or other suitable materials and can be configured to include ports. In one example embodiment, ports of housing 110 can be blocked from fluid communication with ports of mandrel 114 by piston 106 until dissolvable seal 108 has lost mechanical integrity to allow piston 106 to be moved to an open position to allow fluid communication between the ports of mandrel 114 and the ports of housing 110, or in other suitable configurations.

Rupture discs 112 can be formed from aluminum, steel, nickel or other suitable materials having an engineered rupture strength to allow rupture discs 112 to shear at a predetermined level of mechanical stress. In one example embodiment, the rupture strength of rupture discs 112 can be calculated and used to determine a number and placement of rupture discs 112. Likewise, while rupture discs 112 are shown, a pressure safety disc, burst disc, bursting disc, burst diaphragm or other suitable devices can also or alternatively be used.

Mandrel 114 can be formed from steel, carbon steel or other suitable components and can be configured to move within a predetermined area within a space defined by box sub 102, pin sub 116 and other components of valve 100. Mandrel 114 can include a plurality of ports, which are discussed further herein.

Pin sub 116 is configured to be connected to a down-hole portion of a string of casing tubulars (not explicitly shown) or other suitable components. Pin sub 116 can be fabricated from steel, carbon steel or other suitable materials.

Shear screws 118 can be formed from steel having an engineered shear strength to allow shear screws 118 to shear at a predetermined level of mechanical stress. In one example embodiment, the shear strength of shear screws 118 can be calculated and used to determine a number and placement of shear screws 118. Likewise, while shear screws 118 are shown, a shear pin, a shear ring or other suitable shear devices can also or alternatively be used.

In operation, valve 100 is deployed in a casing string, where hydrostatic and applied surface pressure can act on rupture discs 112. Pressure is then applied equally to piston 106 between housing 110 and mandrel 114. In one example embodiment, at a predetermined pressure such as 20,000 psi or other suitable pressures, (such as a maximum rupture disc rating offered), approximately 145 klbs of force will be applied to piston 106. Shear screws 118 can include 16 separate screws that are configured to shear at 2,000 lbs each, for a total of 32,000 lbs of shear strength, and can be configured to prevent piston 106 from shifting until predetermined conditions are met.

Dissolvable seal 108 is configured as shown to be in contact with fluid, which causes its mechanical properties to decrease during the dissolution process. Once dissolvable seal 108 has been exposed to fluid for a predetermined period of time, it dissolves and causes fluid pressure to be applied to shear screws 118, which allows piston 106 to shift downward, completely exposing the ports in mandrel 114 and providing a communication path to the external rock formation. Piston 106 can be held open by magnets installed in pin sub 116, or in other suitable manners.

Figure 2:
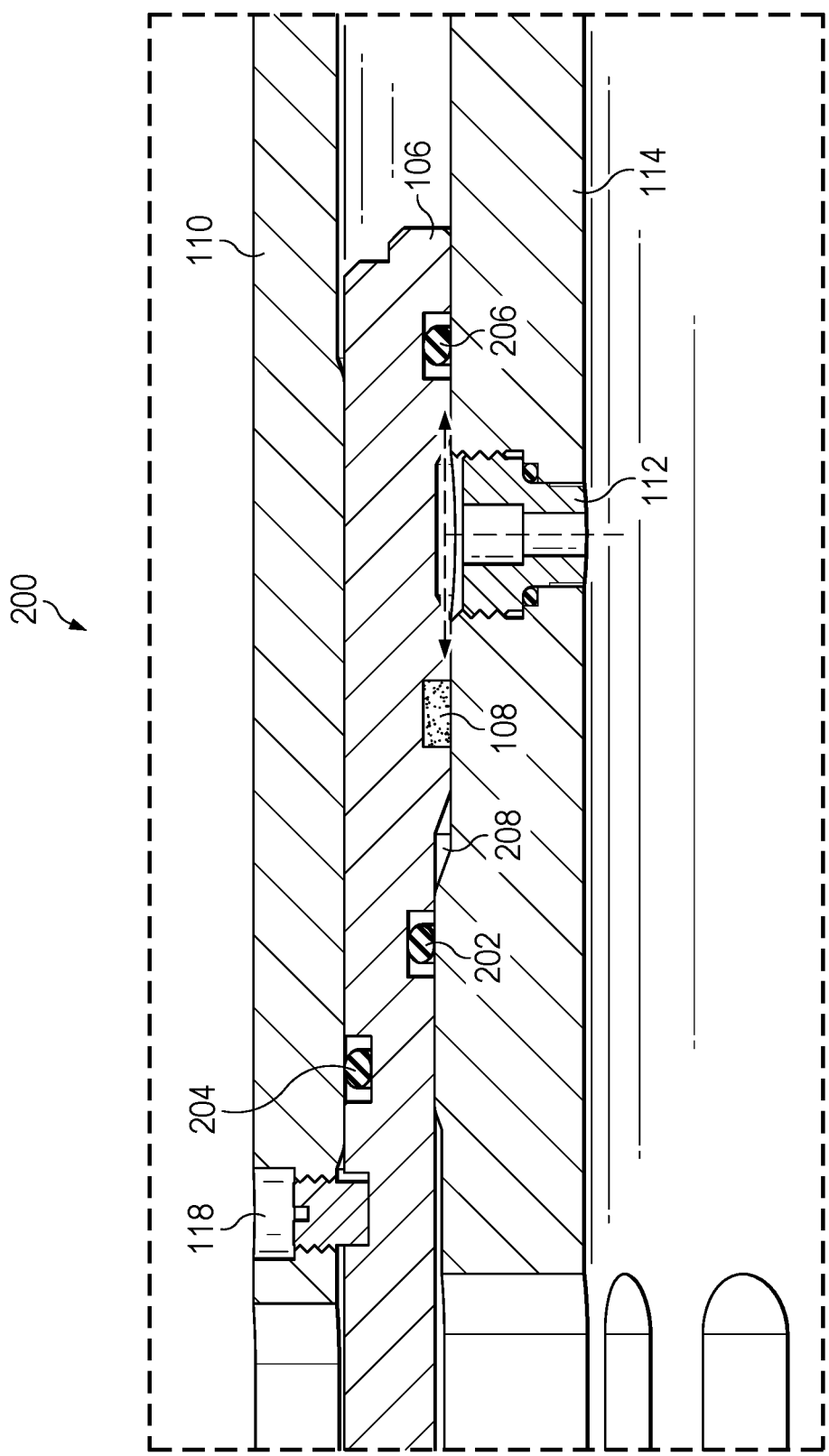
FIG. 2 is a diagram of a piston for a delayed opening fluid communication valve, in accordance with an example embodiment of the present disclosure.

FIG. 2 is a diagram 200 of a piston for a delayed opening fluid communication valve, in accordance with an example embodiment of the present disclosure. Diagram 200 includes o-ring 202 at a location having an associated diameter OD1, o-ring 204 at a location having an associated diameter OD2, and o-ring 206 at a location having an associated diameter OD3. Space 208 defines the difference between OD1 and OD3. O-ring 206 balances the pressure barrier formed by dissolvable seal 108, which is also at diameter OD3, until dissolvable seal 108 has dissolved after rupture discs 112 rupture. At that point, the pressurized fluid can expand into the space between rupture discs 112 and o-ring 202, which increases the force being generated by the application of pressure to the piston. The area is defined by the difference between diameters OD1 and OD3. When OD1 is greater than OD3, this difference results in an area calculated as $A=pi/4*(OD1^2-OD3^2)$, where a positive area results in a positive lateral force that moves the piston into an open position and a negative area results in a negative force that holds the piston in a closed position. By selection of suitable diameters and placements of dissolvable seals, lateral forces can be applied in controllable directions, such as to open or close a piston or other suitable components at designed intervals. As there are no other unbalanced piston areas acting on piston 106 in diagram 200 after dissolvable seal 108 has dissolved, a positive lateral force will be generated and shear screws 118 will shear, allowing piston 106 to move in a positive lateral direction to open the valve.

Figure 3:
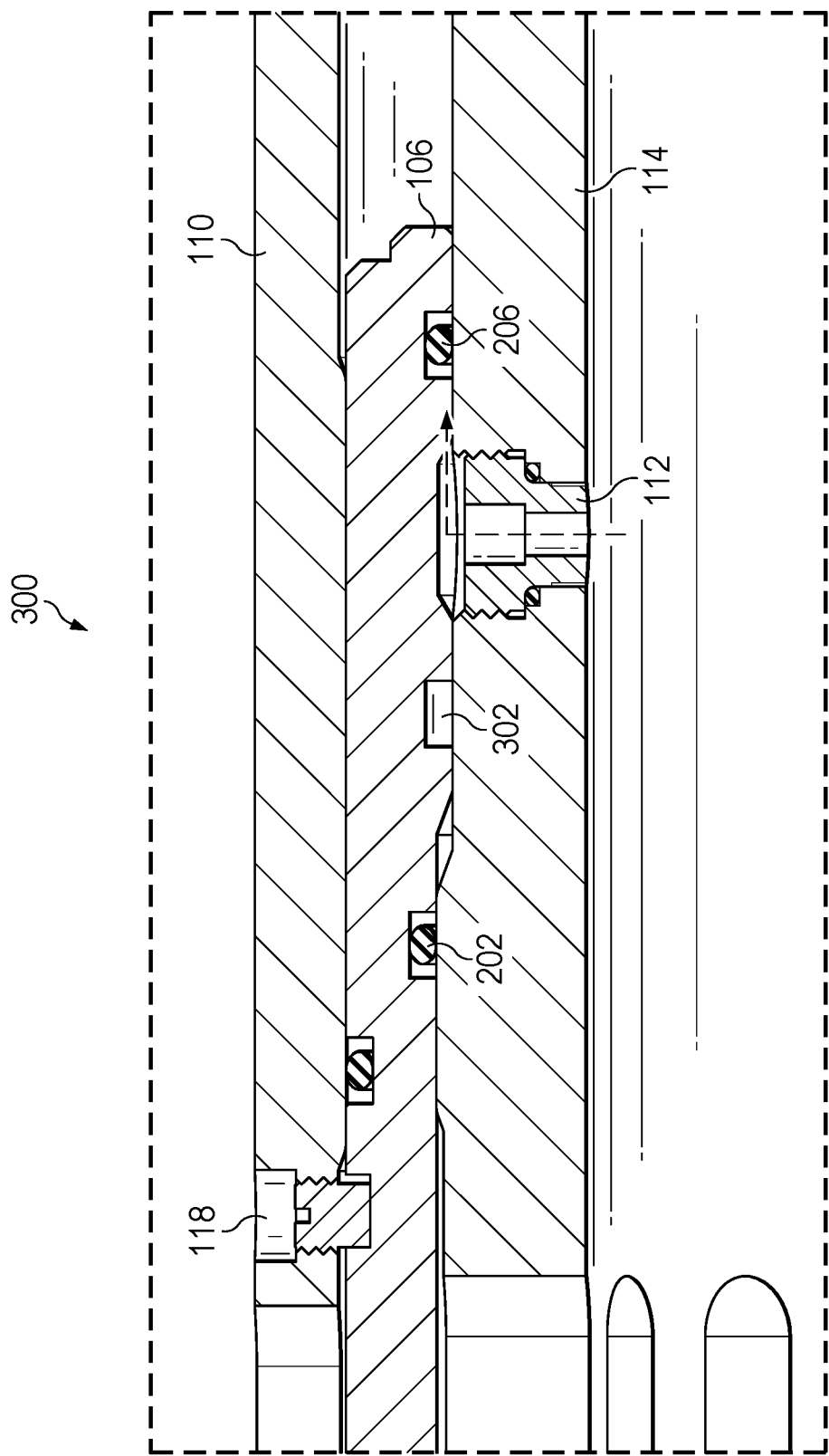
FIG. 3 is a diagram of a piston for a delayed opening fluid communication valve, in accordance with an example embodiment of the present disclosure.

FIG. 3 is a diagram 300 of a piston for a delayed opening fluid communication valve, in accordance with an example embodiment of the present disclosure. Diagram 300 shows dissolvable seal 108 has dissolved, leaving a space 302 for fluid to transit.

Figure 4:
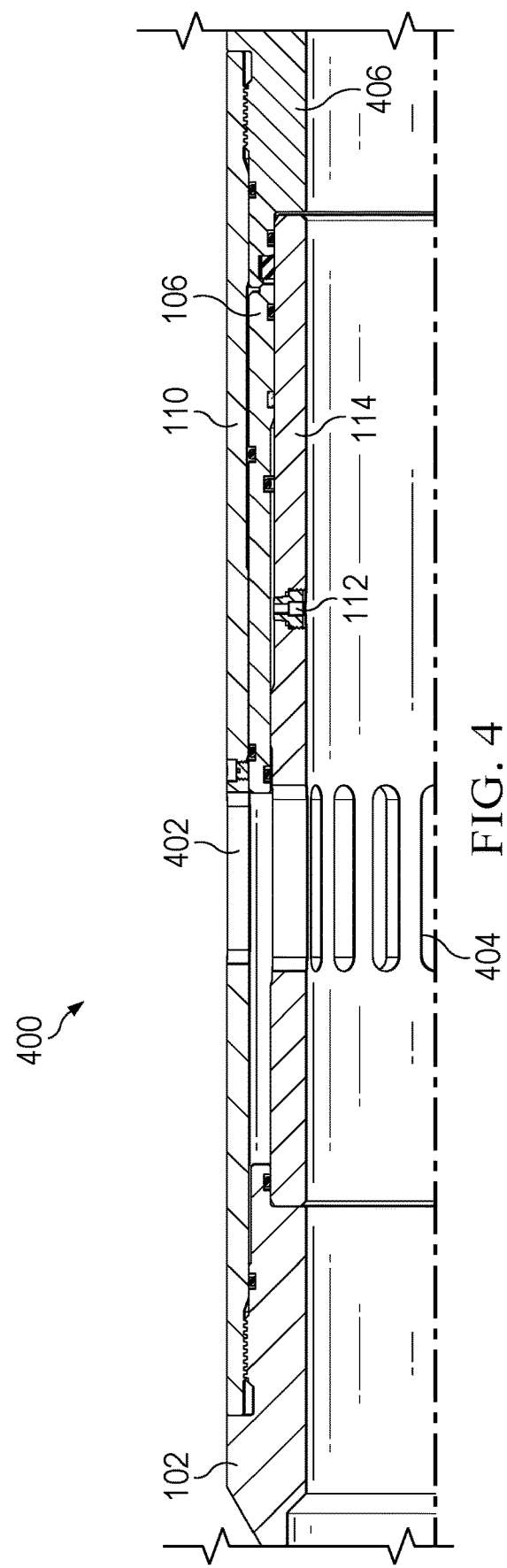
FIG. 4 is a diagram of a piston for a delayed opening fluid communication valve, in accordance with an example embodiment of the present disclosure.

FIG. 4 is a diagram 400 of a piston for a delayed opening fluid communication valve, in accordance with an example embodiment of the present disclosure. Piston 106 has shifted after the shear rings have sheared, resulting in a fluid path through ports 402 of housing 110 and ports 404 of mandrel 114.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes one or more microcomputers or other suitable data processing units, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. The term "data" can refer to a suitable structure for using, conveying or storing data, such as a data field, a data buffer, a data message having the data value and sender/receiver address data, a control message having the data value and one or more operators that cause the receiving system or component to perform a function using the data, or other suitable hardware or software components for the electronic processing of data.

In general, a software system is a system that operates on a processor to perform predetermined functions in response to predetermined data fields. A software system is typically created as an algorithmic source code by a human programmer, and the source code algorithm is then compiled into a machine language algorithm with the source code algorithm functions, and linked to the specific input/output devices, dynamic link libraries and other specific hardware and software components of a processor, which converts the processor from a general purpose processor into a specific purpose processor. This well-known process for implementing an algorithm using a processor should require no explanation for one of even rudimentary skill in the art. For example, a system can be defined by the function it performs and the data fields that it performs the function on. As used herein, a NAME system, where NAME is typically the name of the general function that is performed by the system, refers to a software system that is configured to operate on a processor and to perform the disclosed function on the disclosed data fields. A system can receive one or more data inputs, such as data fields, user-entered data, control data in response to a user prompt or other suitable data, and can determine an action to take based on an algorithm, such as to proceed to a next algorithmic step if data is received, to repeat a prompt if data is not received, to perform a mathematical operation on two data fields, to sort or display data fields or to perform other suitable well-known algorithmic functions. Unless a specific algorithm is disclosed, then any suitable algorithm that would be known to one of skill in the art for performing the function using the associated data fields is contemplated as falling within the scope of the disclosure. For example, a message system that generates a message that includes a sender address field, a recipient address field and a message field would encompass software operating on a processor that can obtain the sender address field, recipient address field and message field from a suitable system or device of the processor, such as a buffer device or buffer system, can assemble the sender address field, recipient address field and message field into a suitable electronic message format (such as an electronic mail message, a TCP/IP message or any other suitable message format that has a sender address field, a recipient address field and message field), and can transmit the electronic message using electronic messaging systems and devices of the processor over a communications medium, such as a network. One of ordinary skill in the art would be able to provide the specific coding for a specific application based on the foregoing disclosure, which is intended to set forth exemplary embodiments of the present disclosure, and not to provide a tutorial for someone having less than ordinary skill in the art, such as someone who is unfamiliar with programming or processors in a suitable programming language. A specific algorithm for performing a function can be provided in a flow chart form or in other suitable formats, where the data fields and associated functions can be set forth in an exemplary order of operations, where the order can be rearranged as suitable and is not intended to be limiting unless explicitly stated to be limiting.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A casing valve, comprising:
   a first component configured to connect to a casing string;
   a second component configured to connect to the casing string;
   a mandrel disposed between the first component and the second component, the mandrel having a plurality of ports;
   a housing disposed outside of the mandrel, the housing having a plurality of ports;
   a piston disposed between the mandrel and the housing and configured to move in a first direction from a first position that forms a barrier between the ports of the mandrel and the ports of the housing to a second position that is adjacent to the ports of the mandrel and the ports of the housing; and
   a dissolvable component configured to restrain the piston in the first position and to dissolve when exposed to a fluid to increase a lateral force on the piston, wherein the dissolvable component comprises a dissolvable seal.

2. The casing valve of claim 1 further comprising a plurality of shear screws configured to hold the piston in position until a shear force is applied.

3. The casing valve of claim 1 wherein the casing valve is a toe initiation valve.

4. The casing valve of claim 1 further comprising one or more seals disposed adjacent to the dissolvable component.

5. The casing valve of claim 1 wherein the dissolvable component is disposed at a first diameter and one or more seals are disposed at a second diameter.

6. The casing valve of claim 1 wherein the dissolvable component is disposed at a first diameter and one or more seals are disposed at a second diameter that is greater than the first diameter.

7. The casing valve of claim 1 wherein the dissolvable component is disposed at a first diameter and one or more seals are disposed at a second diameter that is less than the first diameter.

8. The casing valve of claim 1 further comprising one or more o-rings disposed between the housing and the mandrel.

9. A method of manufacturing a well bore tool, comprising:
   forming a first component configured to connect to a casing string;
   forming a second component configured to connect to the casing string;
   forming a mandrel to be disposed between the first component and the second component, the mandrel having a plurality of ports;
   forming a housing to be disposed outside of the mandrel, the housing having a plurality of ports;
   forming a piston to be disposed between the mandrel and the housing and configured to move in a first direction from a first position that forms a barrier between the ports of the mandrel and the ports of the housing to a second position that is adjacent to the ports of the mandrel and the ports of the housing; and forming a dissolvable seal configured to dissolve when exposed to a fluid to cause a force to be applied to the piston.

10. The method of claim 9 further comprising installing a plurality of shear screws configured to hold the piston in position until a shear force is applied.

11. The method of claim 9 further comprising installing one or more magnets configured to hold the piston in an open position.

12. The method of claim 9 wherein the well bore tool is a toe initiation valve.

13. The method of claim 9 further comprising installing one or more seals adjacent to the dissolvable component.

14. The method of claim 9 wherein the dissolvable component is disposed at a first diameter and one or more seals are disposed at a second diameter.

15. The method of claim 9 wherein the dissolvable component is disposed at a first diameter and one or more seals are disposed at a second diameter that is greater than the first diameter.

16. The method of claim 9 wherein the dissolvable component is disposed at a first diameter and one or more seals are disposed at a second diameter that is less them the first diameter.

17. A casing valve, comprising:

a first component configured to connect to a casing string;

a second component configured to connect to the casing string;

a mandrel disposed between the first component and the second component, the mandrel having a plurality of ports;

a housing disposed outside of the mandrel, the housing having a plurality of ports;

a piston disposed between the mandrel and the housing and configured to move in a first direction from a first position that forms a barrier between the ports of the mandrel and the ports of the housing to a second position that is adjacent to the ports of the mandrel and the ports of the housing;

a dissolvable component configured to restrain the piston in the first position and to dissolve when exposed to a fluid to increase a lateral force on the piston;

a first o-ring disposed between the housing and the mandrel at a first outer diameter; and a second o-ring disposed between the housing and the mandrel at a second outer diameter that is different from the first outer diameter.

18. The casing valve of claim 17 wherein the lateral force is a function of a difference between the first outer diameter and the second outer diameter.

19. The casing valve of claim 17 further comprising a plurality of shear screws configured to hold the piston in position until a shear force is applied.

20. The casing valve of claim 17 wherein the casing valve is a toe initiation valve.

\* \* \* \* \*